Feb. 10, 1970   H. M. ECKERLIN   3,494,177
POSITIONING APPARATUS AND METHOD
Filed June 13, 1967

PRESSURE OF GAS BETWEEN AIR BEARING AND MEMBER

LUBRICATING REGION

BERNOULLI EFFECT REGION

JET IMPACT REGION

GAS FILM THICKNESS

INVENTOR.
HERBERT M. ECKERLIN
BY
ATTORNEY

United States Patent Office 3,494,177
Patented Feb. 10, 1970

3,494,177
POSITIONING APPARATUS AND METHOD
Herbert M. Eckerlin, Raleigh, N.C., assignor to Corning Glass Works, Corning, N.Y., a corporation of New York
Filed June 13, 1967, Ser. No. 645,760
Int. Cl. G01b 13/04
U.S. Cl. 73—37.7     17 Claims

ABSTRACT OF THE DISCLOSURE

A means and method for accurately positioning tape, ribbon, film, and the like by a pair of air bearings having large flat planar faces disposed in an aligned arrangement such that the flat faces are in substantially one plane along the path of the member being positioned. Means are provided for connecting the bearings to a source of pressurized gas and for controlling the flow of such gas through the bearings. The bearings are spaced from the member being positioned a distance such as to create a Bernoulli effect region therebetween wherein the pressure of the gas between the large planar faces of the air bearings and the surface of the member being positioned is negative with respect to ambient. The controlling means may be a control valve, fluid amplifier, or the like. A further embodiment of the present invention includes position sensing means such as a pair of gas nozzles disposed intermediate the bearings adjacent the member surface.

BACKGROUND OF THE INVENTION

To measure the thickness of moving elongated members such as ribbon, tape, film, sheet, and the like by means of air gauging techniques requires that the member be accurately positioned. Such positioning is ordinarily accomplished by means of rollers or other devices which are in continuous contact with such member. Such rollers or devices impart a force to the member so that it is maintained under tension and relatively stiff. This method and apparatus permits the use of a single gauging nozzle but is limited to materials that are sufficiently flexible to permit such surface contact. In addition, such contact may impart surface imperfections to the member, particularly when it is formed of such materials as glass and the like. For such materials it is found that a two nozzle gauging system is desirable. In such an arrangement the member is passed between two gauging nozzles with the accuracy of the air gauging system being very sensitive to the positioning of the member between the nozzles.

SUMMARY OF THE INVENTION

The objects of the present invention are to provide a method and apparatus for a continuous, non-contact manner of accurately positioning an elongated member which overcomes the heretofore noted disadvantages, as well as to provide positioning of a member at a precise distance from a predetermined point, to add stiffness to the member, to minimize or eliminate imparting surface imperfections in a member while it is being positoned, and to eliminate instablity of the member between gauging nozzles.

Broadly, according to the present invention, a pair of air bearings are provided and disposed so that the faces thereof are substantially in one plane, which bearings are connected to a source of pressurized gas with means being provided for controlling the flow of the gas through the bearings, and the member thereafter being disposed adjacent the faces of the bearings at a distance such that a negative pressure relative to ambient is created between the faces and the member surface whereby said member is attracted to the bearing faces and firmly positioned with respect thereto.

Additional objects, features, and advantages of the present invention will become apparent to those skilled in the art, from the following detailed description and the attached drawing on which, by way of example, only the preferred embodiments of this invention are illustrated.

DETAILED DESCRIPTION

Figure 1:
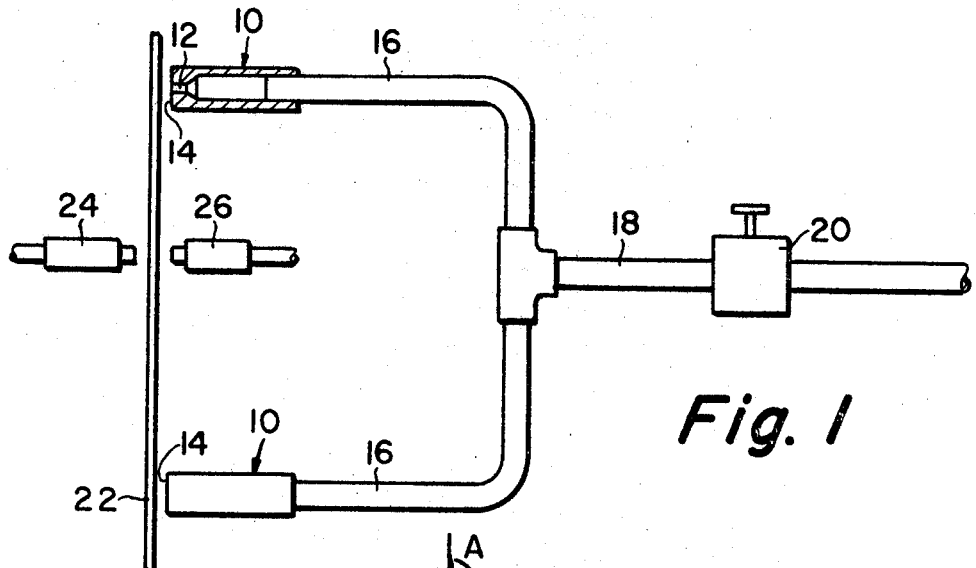
FIGURE 1 is a side elevation of the apparatus of the present invention.

By the term or expression "elongated member" as used herein is meant a ribbon, tape, film, sheet or the like wherein the length thereof is substantially greater than the width. It should be noted that this invention is not limited to a method, device, or apparatus for positioning elongated members nor to any particular material, however, for simplicity this invention will be described in connection with a moving elongated member such as glass ribbon on the draw.

In accordance with this invention a pair of air bearings 10 having a nozzle 12 are disposed so that the flat end surfaces or faces 14 thereof are aligned in substantially one plane. The end surface or face 14 of an air bearing is formed flat and smooth with the bearing nozzle 12 terminating thereat. Bearings 10 are connected by suitable means such as tubes 16 and 18 to a suitable source of compressed gas, not shown. The flow and pressure of such gas is controlled by means of valve 20 which permits regulation of the amount of gas passing through nozzles 12 of bearings 10.

Figure 2:
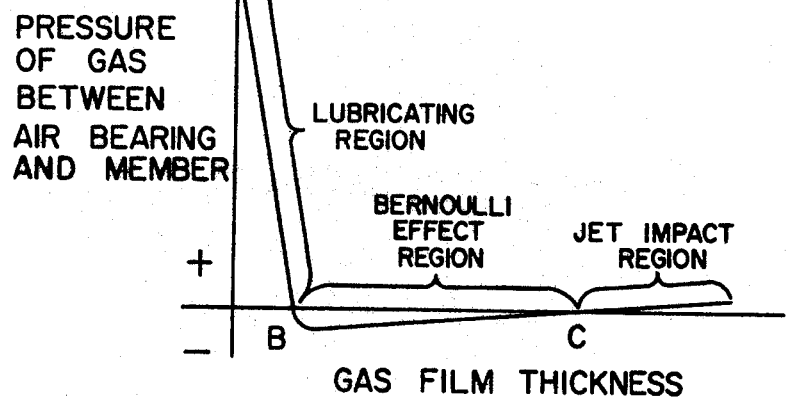
FIGURE 2 is a diagrammatic illustration of the operation of an air bearing.

For an understanding of the operation of an air bearing, reference is made to FIGURE 2. An air bearing is ordinarily used for providing a cushion of gas or air between the face of the bearing and the member which it supports. Such a cushion of gas or air can be used for lubricating purposes such as when some member or body is moved or rotated over the face of the bearing or the bearing can be used as a non-contacting support for a stationary member or body. In such applications the cushion or film of gas is very thin while the pressure of the gas between the bearing face and the member moved over it or the load is very high. However, for a constant gas flow through the bearing nozzle, as the gas film thickness increases the pressure of the gas decreases to a point where, in accordance with Bernoulli's Theorem, the velocity of the gas issuing from the nozzle creates regions of low pressure adjacent the face of the bearing, which low pressure may be less than ambient pressure. As is seen in FIGURE 2, that portion of the curve between points A and B is labeled as the lubricating region. In this region the pressure of the gas between the bearing face and the member surface is positive with respect to ambient for low gas film thicknesses. As the gas film thickness increases, as illustrated between points B and C, the gas pressure between the face of the bearing and the member surface is negative with respect to ambient, that is lower than ambient causing the member to be attracted to the face of the air bearing. This region between points B and C is called the Bernoulli effect region. As the thickness continues to increase beyond point C, the pressure again becomes positive and the gas emitted from the air bearing tends to repel the member. This region is known as the jet impact region. It should be noted that in situations where the member is a thin ribbon, tape, film, sheet, or the like which have very little weight, very little bearing load is created to force the bearing to operate in the lubricating region. Consequently, such light weight members are particularly suitable for operation in the Bernoulli effect region where the member is attracted to the bearing surface.

Referring again to FIGURE 1, the operation of the apparatus of this invention will be described. If, for example, it is desired to measure or monitor the thickness of a moving ribbon 22 of glass on the draw, a pair of air bearings 10 are arranged such that the faces 14 thereof are disposed in substantially one plane parallel to the path of ribbon 22. The flow of gas through the bearing is regulated by valve 20 such that a negative pressure with respect to ambient is developed between the face of the bearing and ribbon 22 whereby the apparatus is operated within the Bernoulli effect region. This causes ribbon 22 to be attracted to the faces of bearings 10 with the distance between the ribbon and faces 14 being at least in part controlled by the amount of gas flow through bearings 10. In this manner, the location of film 22 with respect to the faces of the air bearings can be carefully controlled.

Air thickness gauging nozzles 24 and 26 are then disposed on either side of ribbon 22. The operation of air thickness gauging nozzles is well known in the art. Such gauging nozzles may be connected to suitable pressure sensing devices which are calibrated in terms of thickness as a function of pressure. As a stream of air is discharged from such gauging nozzles it impinges upon a surface causing a back pressure to be developed upstream of the nozzle. Such a back pressure is a function of the distance from the gauging face to the surface upon which the gas impinges. As the thickness of ribbon 22 varies, the surface of the ribbon will move closer or farther away from the gauging nozzle causing back pressure variations. By suitable connection of nozzles 24 and 26 to pressure sensing equipment, the thickness of ribbon 22 may be measured. The air thickness gauging nozzles do not form a part of this invention.

It has been found that the apparatus of the present invention provides a means for positioning having far greater accuracy than is obtainable by purely mechanical means while eliminating pneumatic instability between the air gauging nozzles. This apparatus provides for positioning a member without contact with the surfaces thereof by the positioning device thereby preventing damage to such ribbon surface.

Figure 3:
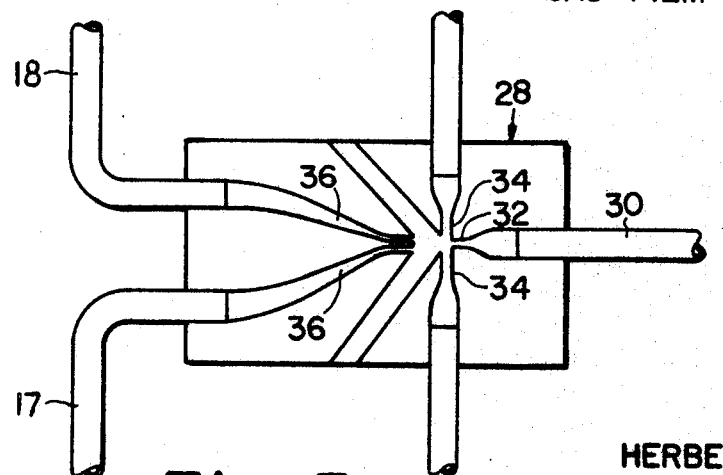
FIGURE 3 is a fragmentary elevation of another embodiment of the present invention.

Referring to FIGURE 3, another embodiment of the present invention is illustrated. A proportional fluid amplifier 28 is shown connected to tube 18 which leads to the bearings described in connection with FIGURE 1. Such a fluid amplifier replaces valve 20 heretofore described. As gas is supplied to the fluid amplifier by means of passage 30 to the inlet nozzle 32 thereof, the gas is proportioned between outlet passages 36. One of the passages 36 is connected to the tube 18 of FIG. 1, the other passage 36 being vented through a tube 17. Control nozzles 34 of amplifier 28 are connected to a suitable source of control signals. By providing a pneumatic signal to one or the other or both of nozzles 34, the stream emitting from nozzle 32 may be deflected and apportioned in varying degrees between outlet passages 36 and ultimately bearings 10. Control nozzles 34 may be connected to a separate source of pneumatic signals which will control the position of ribbon 22 or may be connected to gauging nozzles 24 and 26 which sense the change in the position of ribbon 22. In such an embodiment nozzles 24 and 26 would not be employed as thickness sensing nozzles but rather nozzles for sensing the relative position of ribbon 22.

Although a proportional fluid amplifier is illustrated in FIGURE 3, a bistable fluid amplifier may also be used in a situation where positioning is desired by only one of a pair of air bearings.

The gas suitable for the purposes of the present invention may be any gas such as air, nitrogen, or the like. This invention is not limited to any particular gas.

Although the invention was described in terms of a glass ribbon, it is equally suitable for other materials such as metal, plastics, and the like either of a substantially continuous nature or of a finite length. This invention is also applicable to coated members such as magnetic tapes or the like.

As one example of the present invention, a pair of air bearings having a nozzle diameter of 0.040 inch and a face diameter of 0.500 inch were provided. These nozzles were arranged in a vertical arrangement wherein the faces thereof were in substantially a single plane and were connected to a source of air at a pressure of about 20 p.s.i. Intermediate the bearings a pair of air thickness gauging nozzles were positioned to permit a ribbon of glass to pass between such thickness gauging nozzles while adjacent the faces of the air bearings. This ribbon was of a substantially continuous nature being provided from a ribbon manufacturing apparatus. The apparatus was operated in the Bernoulli effect region whereby the glass ribbon was attracted to the face of each bearing with an air film between the glass ribbon and the face of the bearings being about 0.003 inch. It was found that the ribbon was positioned with an accuracy to within about 0.0001 inch permitting accurate thickness measurements of the ribbon by means of the air thickness gauging nozzles.

Although the present invention has been described with respect to specific details of certain embodiments thereof, it is not intended that such details be limitations upon the scope of the invention.

I claim:

1. An apparatus for positioning a substantially continuous elongated member having at least one substantially flat surface comprising a pair of air bearings having large flat planar faces disposed in an aligned arrangement such that said flat faces are in substantially one plane along the path of said member adjacent one of said substantially flat surfaces of said member, means for connecting said bearings to source of pressurized gas, and means for controlling flow of said gas through said bearings, said air bearings being spaced from said elongated member a distance such as to create a Bernoulli effect region therebetween wherein the pressure of said gas between the large planar faces of said air bearings and said one flat surface of said elongated member is negative with respect to ambient.

2. The apparatus of claim 1 wherein said substantially continuous elongated member is a moving ribbon disposed adjacent said large planar faces.

3. The apparatus of claim 2 wherein said means for controlling the gas flow is a control valve.

4. The apparatus of claim 2 wherein said means for controlling the gas flow is a fluid amplifier embodying a power stream nozzle and a pair of control nozzles.

5. The apparatus of claim 4 further comprising position sensing means disposed intermediate said bearings adjacent said elongated member and connected to said control nozzles of said fluid amplifier.

6. The apparatus of claim 5 wherein said sensing means are a pair of position sensing gas nozzles disposed adjacent opposing flat surfaces of said elongated member.

7. The apparatus of claim 1 further comprising means positioned adjacent said member between said pair of air bearings for sensing a physical characteristic of said member.

8. The apparatus of claim 7 wherein said sensing means determines the thickness of said member.

9. The apparatus of claim 8 wherein said sensing means comprises a pair of gas nozzles disposed adjacent opposing surfaces of said elongated member, the stream of gas discharged from each of said nozzles impinging upon the adjacent surface of said member, thereby causing a back pressure to be developed upstream of each of said nozzles, said back pressure being a function of the distance from the gas emitting face of said nozzle to the adjacent surface of said member upon which said gas stream impinges.

10. The apparatus of claim 9 wherein said means for controlling the gas flow is a fluid amplifier embodying a power stream nozzle and a pair of control nozzles, and means for respectively connecting said pair of gas nozzles to said pair of control nozzles so that the back pressure developed upstream of each of said gas nozzles controls the amount of fluid flowing through said bearings.

11. A positioning apparatus comprising
a pair of air bearings having large planar faces aligned in a planar arrangement with one another,
means connecting said bearings to a source of pressurized gas, and
means for controlling the flow of said gas through said bearings,
said bearings being spaced from a member being positioned so as to operate in the Bernoulli effect region.

12. The apparatus of claim 11 wherein said means for controlling the gas flow is a control valve.

13. The apparatus of claim 11 wherein said means for controlling said flow is a fluid amplifier.

14. The apparatus of claim 11 wherein said gas is air.

15. A method for positioning a member having at least one substantially flat surface comprising the steps of
providing a pair of air bearings having large planar faces,
disposing said air bearings so that said large planar faces are substantially in one plane,
plowing gas through said bearings, and
disposing one of said substantially flat surfaces of said member adjacent said large planar faces of said bearings wherein the spacing therebetween is such that a negative pressure with respect to ambient is created between said faces of said bearings and said member whereby said member is positioned.

16. The method of claim 15 wherein said member is a moving elongated member.

17. The method of claim 15 further comprising the step of controlling the flow of gas through said bearing to regulate the distance between the faces of said bearings and said member.

References Cited

UNITED STATES PATENTS

| | | | |
|---|---|---|---|
| 2,276,036 | 3/1942 | Hanna et al. | 73—37.7 |
| 3,194,055 | 7/1965 | Knobe | 73—37.5 |
| 3,317,039 | 5/1967 | Wadey | 73—37.7 |
| 3,319,856 | 5/1967 | Stanley | 271—74 |

LOUIS R. PRINCE, Primary Examiner

WILLIAM A. HENRY II, Assistant Examiner

PO-1050
(5/69)

UNITED STATES PATENT OFFICE
CERTIFICATE OF CORRECTION

Patent No. 3,494,177         Dated February 10, 1970

Inventor(s) Herbert M. Eckerlin

It is certified that error appears in the above-identified patent and that said Letters Patent are hereby corrected as shown below:

Column 1, line 61, instablity" should read
--instability--.

Column 6, line 6, "plowing" should read --flowing--.

SIGNED AND
SEALED
JUL 14 1970

(SEAL)
Attest:

Edward M. Fletcher, Jr.
Attesting Officer

WILLIAM E. SCHUYLER, JR.
Commissioner of Patents